United States Patent
Wu et al.

(10) Patent No.: US 8,705,085 B2
(45) Date of Patent: Apr. 22, 2014

(54) PRINTER WITH POWER SAVING MODULE AND METHOD FOR PRINTING

(75) Inventors: Yi-Fang Wu, Taipei Hsien (TW); Yong-Hui Xiao, Shenzhen (CN); Li-Rong Zhang, Shenzhen (CN)

(73) Assignees: Hong Fu Jin Precision Industry (Shen Zhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 1044 days.

(21) Appl. No.: 12/551,718

(22) Filed: Sep. 1, 2009

(65) Prior Publication Data
US 2010/0182626 A1 Jul. 22, 2010

(51) Int. Cl.
*G06F 3/12* (2006.01)
*G06K 15/00* (2006.01)

(52) U.S. Cl.
USPC ........ 358/1.15; 358/1.13; 358/1.14; 713/323; 713/324

(58) Field of Classification Search
USPC ............................ 358/1.1–1.18; 713/300–340
See application file for complete search history.

(56) References Cited

U.S. PATENT DOCUMENTS

| | | | | |
|---|---|---|---|---|
| 5,937,148 A * | 8/1999 | Okazawa | ...... | 358/1.13 |
| 6,072,585 A * | 6/2000 | Dutton et al. | ...... | 358/1.12 |
| 6,134,401 A * | 10/2000 | Yun et al. | ...... | 399/70 |
| 6,256,464 B1 * | 7/2001 | Sumiyoshi | ...... | 399/88 |
| 6,711,294 B1 * | 3/2004 | Hamzy et al. | ...... | 382/232 |
| 6,801,730 B2 * | 10/2004 | Johnson et al. | ...... | 399/75 |
| 7,532,769 B2 * | 5/2009 | Ono et al. | ...... | 382/276 |
| 8,024,398 B2 * | 9/2011 | Cocotis et al. | ...... | 709/203 |
| 8,411,328 B2 * | 4/2013 | Tsuchitoi | ...... | 358/3.28 |
| 2001/0017700 A1 * | 8/2001 | Homma | ...... | 358/1.1 |
| 2003/0103221 A1 * | 6/2003 | Natori | ...... | 358/1.9 |
| 2004/0012813 A1 * | 1/2004 | Wu et al. | ...... | 358/1.16 |
| 2004/0088378 A1 * | 5/2004 | Moats | ...... | 709/219 |
| 2004/0130744 A1 * | 7/2004 | Wu et al. | ...... | 358/1.15 |
| 2005/0286075 A1 * | 12/2005 | Ryu et al. | ...... | 358/1.15 |
| 2007/0180277 A1 * | 8/2007 | Jayaram et al. | ...... | 713/300 |

* cited by examiner

*Primary Examiner* — Dennis Dicker
(74) *Attorney, Agent, or Firm* — Altis Law Group, Inc.

(57) ABSTRACT

A printer includes a data receiving unit, a print mechanism, a print controlling module and a power management module. The data receiving unit is capable of receiving a file from a client. The print mechanism is used for printing out the file into hard copy. The print controlling module is connected to the print mechanism for processing the file. The power management module is capable of detecting activity of the data receiving unit and supplying power to the printing controlling module and the print mechanism. When no file is received by the data receiving unit for a predetermined time, the power management module is capable of cutting off the power to print management module and the print mechanism.

9 Claims, 3 Drawing Sheets

PRINTER WITH POWER SAVING MODULE AND METHOD FOR PRINTING

BACKGROUND

1. Technical Field

The disclosure generally relates to printers and methods for printing, especially to a printer and power saving method for printing.

2. Description of Related Art

Conventional printers in offices are usually kept powered on all day. However, most print jobs from the clients are intermittent. It is a waste of power for printers to remain on between jobs. In addition, a printer driver usually needs to be installed in clients before printing. The user may use various different operating systems, such as WINDOWS or UNIX. These operating systems must be installed with different printer drivers to realize printing operations.

DETAILED DESCRIPTION

Figure 1:
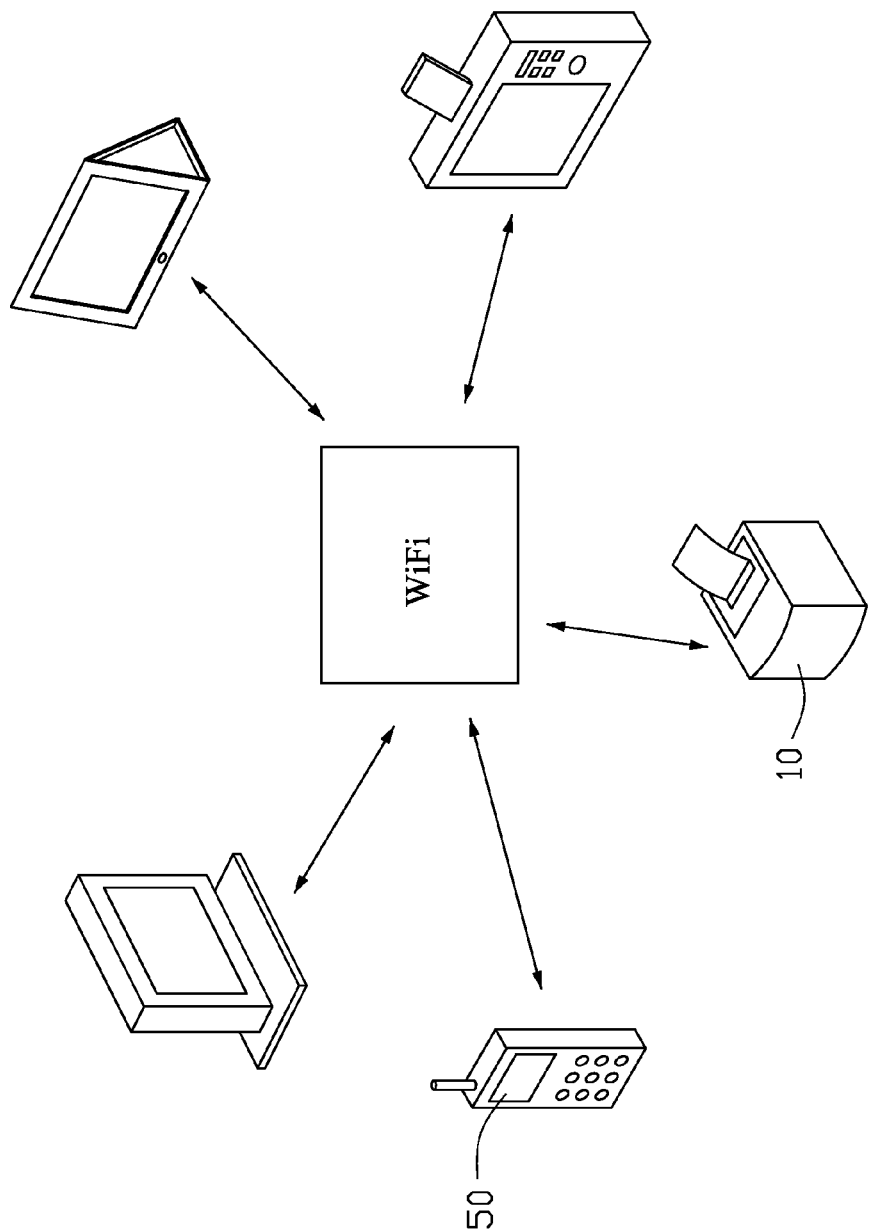
FIG. 1 is a schematic view showing a connection relationship of a plurality of clients and a printer.

Referring to FIG. 1, a print system includes a printer 10 and a plurality of clients 50 connected to the printer 10. The clients 50 may be connected to the printer 10 through a wireless connection, such as WIFI based on IEEE 802.11 standards. The clients 50 may be connected to the printer 10 through the Internet or an intranet. The clients 50 may include a computer, a digital media frame, a mobile phone, or other electronic device. The printer 10 may be remote from the clients 50.

Figure 2:
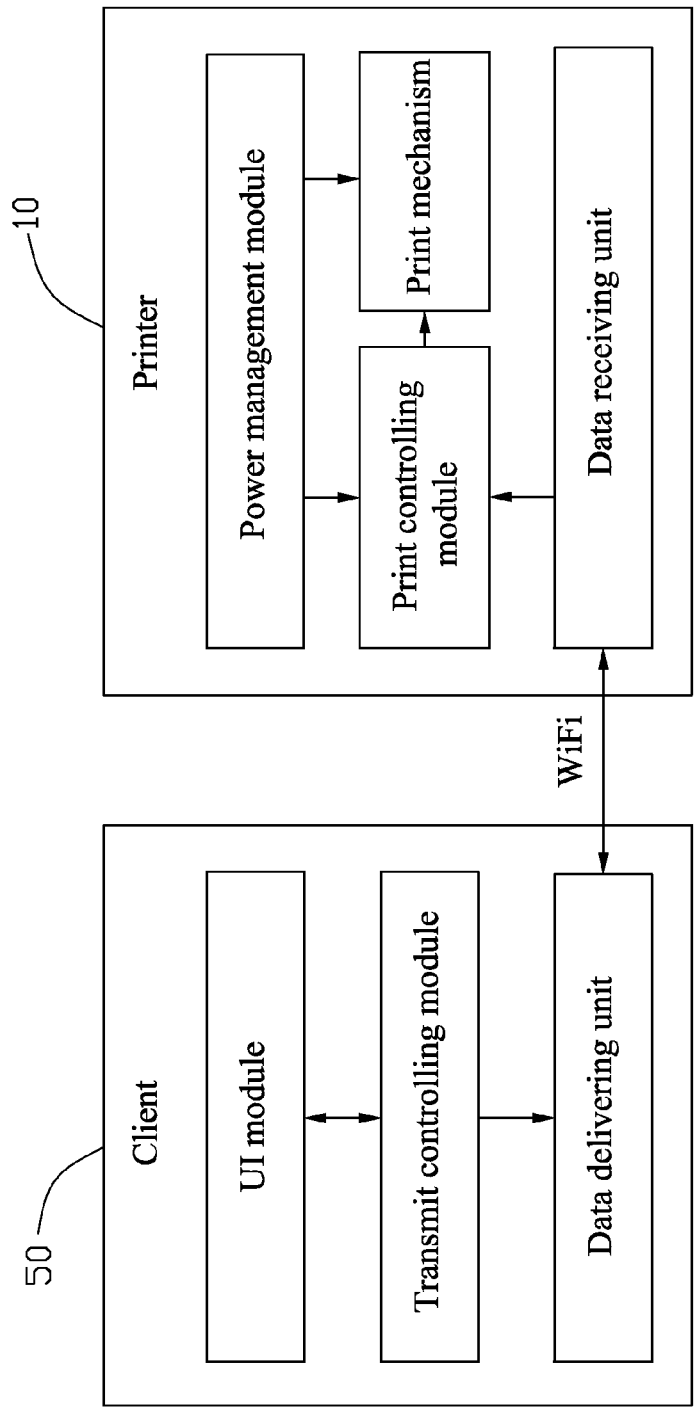
FIG. 2 is a block view of the printer and one of the clients.

Referring to FIG. 2, each client 50 is installed with a web browser and stores at least one file to be printed. The client 50 includes a user interface (UI) module for controlling printing operations, a transmitting controlling module and a data delivering unit for sending the file to the printer 10. The UI module may be constructed using Hypertext Mark-up Language (HTML), and can access the printer 10 through the web browser of the client 50 based on TCP/IP protocol.

The printer 10 includes a data receiving unit, a print mechanism, a print controlling module, and a power management module. The data receiving unit is capable of receiving the files from the client 50. The print mechanism may be used to print the files out into hard copies. The print controlling module is connected to the print mechanism. The print controlling module is capable of previewing the file to the client 50. The power management module is capable of detecting activity of the data receiving unit and supplying power to the printing controlling module and the print mechanism accordingly. When no file is received by the data receiving unit for a predetermined time, the power management module may cut off power to the print management module and the print mechanism.

The file from the clients 50 cannot be printed by the print mechanism directly. The print controlling module is installed with a printer driver, so the print controlling module is capable of transforming the file in an original format, such as doc, jpg, etc into a file with a format that can be directly printed by the print mechanism, such as txt, bmp, etc. The print controlling module includes a storage sub-module, such as a hard disk, a cache, or a flash, to store the file from the client 50.

The print controlling module is capable of storing the file in the original format from the client 50 and transforming the file in the original format to a file in the format that can be directly printed by the print mechanism.

Figure 3:
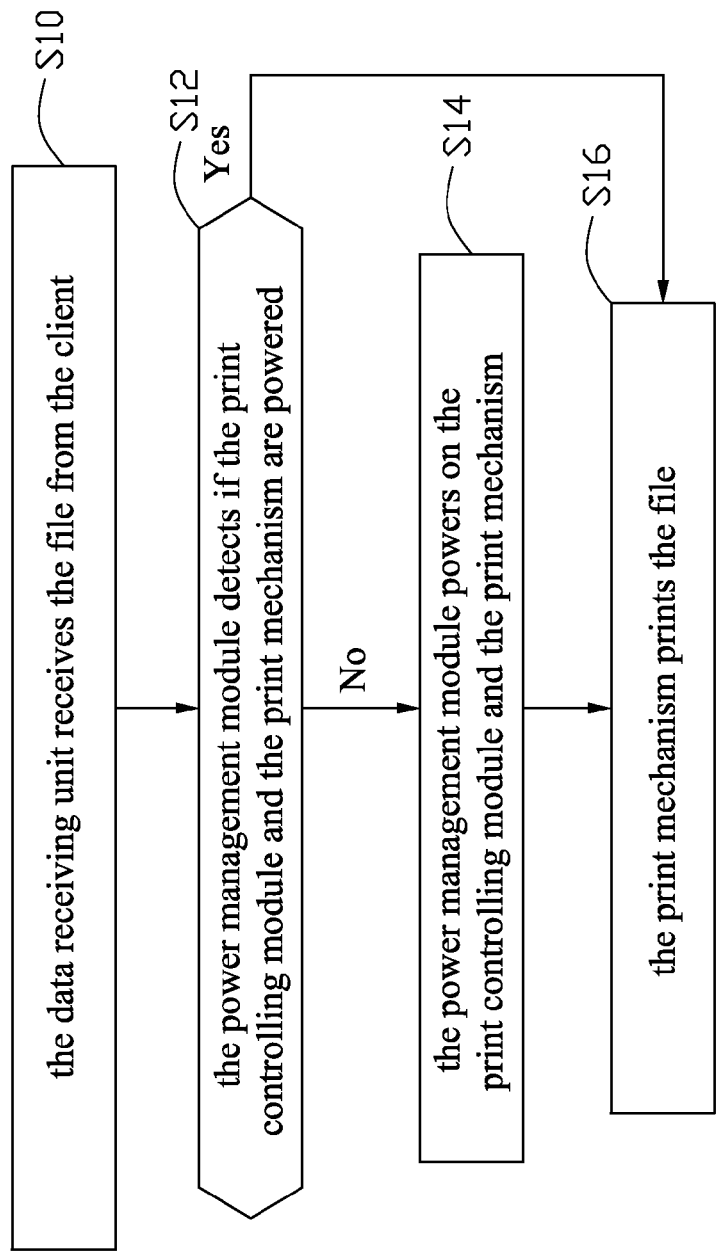
FIG. 3 is a flowchart of a method for printing.

Referring to FIG. 3, a method for printing includes the following steps.

In step 10, the data receiving unit receives the file from the client 50.

In step 12, the power management module detects if the print controlling module and the print mechanism are powered. If the print controlling module and the print mechanism are powered then flow moves to step 16. However, if the print controlling module and the print mechanism are not powered, the flow moves to step 14. Before the step 12, the power management module may detect if the file is received by the data receiving unit in a predetermined time; if no file is received, the power management module may power off the print controlling module and the print mechanism.

In step 14, the power management module powers on the print controlling module and the print mechanism.

In step 16, the print mechanism prints the file.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

It is also to be understood that the above description and the claims drawn to a method may include some indication in reference to certain steps. However, the indication used is only to be viewed for identification purposes and not as a suggestion as to an order for the steps.

What is claimed is:

1. A print system comprising:
    a client computer comprising a user interface (UI) module;
    a printer connected to the client computer, the printer comprising:
        a data receiving unit adapted to receive a file from the client computer;
        a print controlling module adapted to convert the file into a bitmap image;
        a print mechanism adapted to print out the bitmap image into hard copy;
        a power management module adapted to detect activity of the data receiving unit and to supply power to the print controlling module and the print mechanism, wherein when no file is received by the data receiving unit for a predetermined time, the power management module is adapted to cut off power to the print controlling module and the print mechanism;
    wherein the client computer comprises a user interface (UI) module adapted to access the printer to preview the bitmap image through a web browser.

2. The print system of claim 1, wherein the UI module is constructed using Hypertext Mark-up Language (HTML).

3. The print system of claim 2, wherein the printer is connected to the client computer through a wireless network.

4. The print system of claim 1, wherein the printer further comprises a storage module adapted to store the bitmap image, the storage module being accessible to the client computer.

5. A printing method comprising:
- connecting a computer client to a printer, the computer comprising a user interface (UI) module, the printer comprising a data receiving unit, a print mechanism, a print controlling module connected to the print mechanism, and a power management module;
- receiving a file from the client computer by the data receiving unit;
- detecting by the power management module if the print controlling module and the print mechanism are powered on;
- powering on the print controlling module and the print mechanism when the print controlling module and the print mechanism are powered off;
- converting the file into a bitmap image by the print controlling module;
- accessing the printer to preview the bitmap image through a web browser by the UI module; and
- printing the bitmap image out into hard copy through the print mechanism.

6. The printing method of claim 5, further comprising storing the bitmap image in a storage module of the printer.

7. The printing method of claim 6, wherein the step of accessing the printer further comprising accessing the storage module to read the bitmap image by the UI module.

8. The printing method of claim 5, further comprising constructing the UI module by using Hypertext Mark-up Language (HTML).

9. The printing method of claim 5, wherein the printer is connected to the client computer through a wireless network.

\* \* \* \* \*